United States Patent Office 3,504,058
Patented Mar. 31, 1970

3,504,058
PROCESS FOR MANUFACTURING SINTERED
PELLETS OF NUCLEAR FUEL
Yves J. M. Masselot, Manosque, France, assignor to Commissariat a l'Energie Atomique, Paris, France
No Drawing. Filed Feb. 2, 1968, Ser. No. 702,507
Claims priority, application France, Feb. 13, 1967, 94,722
Int. Cl. G21c 21/00
U.S. Cl. 264—.5                                  4 Claims

ABSTRACT OF THE DISCLOSURE

For manufacturing sintered pellets of nuclear oxide fuel, a sintering inhibitor, preferably zinc behenate or zinc stearate is added to powder of uranium, plutonium and/or thorium dioxide, the mixture is cold pressed into bodies, the bodies are broken into granules and the granules are coated with the sintering inhibitor, cold pressed into pellets and sintered in a reducing atmosphere at a temperature equal to or higher than 1500° C.

---

The present invention relates to a process for manufacturing sintered pellets of uranium dioxide, plutonium dioxide and/or thorium dioxide for use as nuclear fuel.

For a long time, when manufacturing sintered pellets made of $UO_2$, $PuO_2$, $ThO_2$ (simple oxides or mixed oxides), it has been tried to obtain a high density, as close as possible to the maximum theoretical density. It has now appeared that it was preferable to utilize sintered products whose density is only a fraction of the maximum theoretical density, comprised between 75 and 95%, and having a regularly distributed porosity if high burnup rates approximating 80,000 mwd./t. are to be obtained. Such pellets are more adapted to retain the fission products without the cracks found in high density pellets when subjected to high burn-up.

It is known that decreasing the sintering temperature leads to a reduction of the density; it could be thought that the wanted purpose could be achieved by decreasing the temperature from about 1650° C. to about 1200° C. This solution has proven not satisfactory; when the pellets are subsequently brought to a temperature higher than 1200° C. in a reactor, the density increases except in a thin external layer along the can. Furthermore, if the fuel is made of mixed oxides $UO_2/PuO_2$, the oxides diffuse badly at such low a temperature. As a result it may be considered that a sintering temperature equal to or higher than 1500° C. is necessary.

Another approach was to mix granules of dioxide with a sufficient percentage of a sintering inhibitor, such as zinc behenate, before pressing them into pellets intended to be subjected to a final sintering step above 1500° C. The density was lower than the maximum theoretical density, but it has appeared that the porosity was mainly due to a lattice of cracks resulting from the accumulation of the inhibitor around the granules and conduced to brittle pellets unable to retain the fission products.

It is an object of the invention to provide a process for manufacturing sintered pellets of $UO_2$, $PuO_2$ and/or $ThO_2$ meeting the requirements of the practice better than the prior art processes, particularly in that said process allows to obtain pellets with the following characteristics: a density that may be accurately adjusted at a value substantially lower than the maximum theoretical density, of from 75 to 95% of said theoretical density; a good reproducibility of the shrinkage occurring during the sintering step, which avoids a subsequent machining step in most cases; an appropriate recrystallisation of the oxide; a substantially complete stability up to a temperature of about 1600° C.; a very small contamination by impurities due to additives.

According to the invention, there is provided a process for manufacturing sintered pellets including the steps of: grinding uranium, plutonium and/or thorium dioxide into powder; adding to said powder from 1 to 7% by weight of a salt of a fat acid constituting a sintering inhibitor, preferably zinc behenate $[CH_3(CH_2)_{20}COO]_2Zn$ or zinc stearate $[CH_3(CH_2)_{16}COO]_2Zn$ cold-pressing the mixture into bodies; breaking said bodies into granules, coating the granules with said sintering inhibitor in a proportion comprised between 0.2 and 1% by weight; cold-pressing the coated granules into pellets; and sintering the pellets in a reducing atmosphere at a temperature at least equal to 1500° C.

After the bodies have been broken, they are screened and preferably only those granules having a granulometry of from 0.3 to 0.6 mm. are kept; the sintering step is preferably carried out at a temperature of between 1600 and 1700° C. for from 3 to 5 hours.

The invention will now be described by way of non-limitative examples, corresponding to the manufacture of pellets of uranium dioxide, zinc behenate being used as a sintering inhibitor.

Finely divided powder of zinc behenate, having a granulometry smaller than $1\mu$, is added to a finely divided powder of uraniumm oxide $UO_2$ prepared according to a conventional process, such as calcination, reduction and milling. The powder may be for instance prepared by calcining ammonium diuranate at 900° C. for one hour, reducing it at 900° C. for two hours in an atmosphere containing 10% of hydrogen and 90% of nitrogen and milling the obtained agglomerates to powder. No binder is added to the UO–zinc behenate mixture.

Pellet-shaped bodies of the mixture are prepared in a hydraulic press under a pressure of about 1500 bars. The bodies are broken in a mill and only the granules that pass through a screen of 0.6 mm. and do not pass through a screen of 0.3 mm. are retained. These granules are coated with finely divided zinc behenate in a conventional mixer, the percentage of behenate being comprised between 0.2 and 0.3% by weight. The coated granules are shaped by cold-pressing them under a pressure comprised between 4000 and 7000 bars for obtaining pellets having the desired final shape, except that the shrinkage is taken into account. Said pellets, which have sufficient cohesion and strength to permit handling, are sintered for three hours in a reducing atmosphere at a temperature of 1700° C. The reducing atmosphere is provided by a flow of gas consisting of 10% hydrogen and 90% argon and prevents oxides super-stoichiometric in oxygen content from occurring. It is known that such a super-stoichiometry must be avoided for it is unfavourable to the cohesion of the pellets if in contact with molten sodium.

The density of so-manufactured pellets is:

About 90% of the theoretical density with 1% of zinc behenate added to the dioxide powder during the first mixing step;

About 85% of the theoretical density with 2.5 to 3% of zinc behenate added to the dioxide powder;

About 80% of the theoretical density with 5% of zinc behenate added to the dioxide powder.

As a second example, annular pellets made of a mixed dioxide of enriched uranium of plutonium $(U_{0.8}, Pu_{0.2})O_2$ for use as fuel elements in a fast neutron reactor, have been prepared according to the same process as above; the density of the pellets was found to be about 95% of the maximum theoretical density.

In all cases, the residual percentages of carbon and of zinc were found both lower than 50 p.p.m. in the sintered pellets. The shrinkage of the pellets, during the final sintering step, was almost reproducible, so that a final machining step is not necessary if a tolerance of 5% on diameter is accepted.

It will be understood that the invention is not to be limited to the details given herein, but that it may be modified while remaining within the scope and spirit of the appended claims.

I claim:

1. A process for manufacturing pellets of sintered fuel of at least one of the elements of the group consisting of uranium, plutonium and thorium dioxide, mixtures thereof and mixed oxides of U, Pu and Th comprising the steps of grinding at least one of said oxides into powder; adding 1 to 7% by weight of a sintering inhibitor consisting in a salt of a fatty acid, cold pressing the mixture into bodies; breaking said bodies into granules; coating the granules with said salt of a fatty acid in a proportion comprising between 0.2 and 1% by weight; cold-pressing the coated granules into pellets; and sintering the pellets in a chemically reducing atmosphere at a temperature of at least 1500° C.

2. A process according to claim 1, wherein salt is zinc behenate $[CH_3(CH_2)_{20}COO]_2Zn$ or zinc stearate $$[CH_3(CH_2)_{16}COO]_2Zn$$

3. A process according to claim 2, wherein the products resulting from the breaking step are screened and only those granules having a granulometry comprised between 0.3 and 0.6 mm. are used for preparing said pellets.

4. A process according to claim 2, wherein the sintering step is carried out at a temperature of from 1600 to 1700° C. for three to five hours.

No references cited.

BENJAMIN R. PADGETT, Primary Examiner

MELVIN J. SCOLNICK, Assistant Examiner

U.S. Cl. X.R.

252—301.1; 264—241